United States Patent
Thom et al.

(10) Patent No.: US 6,669,254 B2
(45) Date of Patent: Dec. 30, 2003

(54) MANUAL PICK-UP DEVICE

(75) Inventors: Paul Thom, Clifton, NJ (US); David Landsberger, Caldwell, NJ (US); Francis Gomes, Jersey City, NJ (US)

(73) Assignee: Bel-Art Products, Inc., Pequannock, NJ (US)

( * ) Notice: Subject to any disclaimer, the term of this patent is extended or adjusted under 35 U.S.C. 154(b) by 0 days.

(21) Appl. No.: 10/121,526

(22) Filed: Apr. 12, 2002

(65) Prior Publication Data

US 2003/0193204 A1 Oct. 16, 2003

(51) Int. Cl.[7] .................................................. B25J 1/00
(52) U.S. Cl. ........................................ 294/19.1; 294/104
(58) Field of Search ............................ 294/11, 19.1, 22, 294/23, 24, 50.8, 50.9, 103.1, 104, 115

(56) References Cited

U.S. PATENT DOCUMENTS

| | | | | |
|---|---|---|---|---|
| 1,855,477 A | * | 4/1932 | Emery | 294/50.9 X |
| 2,469,865 A | * | 5/1949 | Crow | 294/19.1 X |
| 2,739,008 A | * | 3/1956 | Renner | 294/23 |
| 2,759,758 A | * | 8/1956 | Yancey | 294/19.1 X |
| 3,146,015 A | * | 8/1964 | Roberge | 294/19.1 |
| 3,885,824 A | | 5/1975 | Hulst | |
| 3,937,512 A | | 2/1976 | Baughman | |
| 4,037,868 A | | 7/1977 | Baker | |
| 4,160,563 A | | 7/1979 | Whitney | |
| 4,208,830 A | * | 6/1980 | Yoshida | 294/19.1 |
| 4,645,253 A | * | 2/1987 | Hogden et al. | 294/19.1 |
| 5,029,922 A | * | 7/1991 | DiNapoli et al. | 294/27.1 |
| 5,192,104 A | | 3/1993 | Lin | |
| D358,970 S | | 6/1995 | Mayoue | |
| 5,570,919 A | | 11/1996 | Eusebe | |
| 5,577,785 A | | 11/1996 | Traber et al. | |
| 5,590,923 A | | 1/1997 | Berger et al. | |
| D386,053 S | | 11/1997 | James | |
| 5,823,590 A | | 10/1998 | Forrest et al. | |
| 5,857,723 A | | 1/1999 | Mathieu et al. | |
| 5,895,082 A | | 4/1999 | Kaluzny | |
| 6,412,840 B1 | * | 7/2002 | Wen | 294/24 |

OTHER PUBLICATIONS

Maddak, Inc., Catalog No. 0699, pp. 62, 63, and 64, no date.

* cited by examiner

*Primary Examiner*—Dean J. Kramer
(74) *Attorney, Agent, or Firm*—Lawrence G. Fridman

(57) ABSTRACT

A manual pick-up device includes a housing having a handle at one end, a fixed upper jaw at an opposite end, and a longitudinally extending shank extending therebetween. A movable jaw member is pivotally supported within the housing and extends outwardly through a housing opening to enable cooperation with the fixed upper jaw. A spring-biased actuating trigger is connected to the movable lower jaw by a connection element such that manual actuation of the trigger toward the handle urges the closing of the movable jaw against the fixed upper jaw, so as to enable an operator to grasp an object between the upper and lower jaws of the device.

15 Claims, 5 Drawing Sheets

FIG. 3

MANUAL PICK-UP DEVICE

BACKGROUND OF THE INVENTION

1. Field of the Invention

The present invention relates generally to pick-up devices and, more particularly, to a lightweight manual pick-up device having a design adapted to facilitate manufacturing and assembly thereof.

2. Description of the Prior Art

Many individuals have physical limitations that restrict their range of motion, making it difficult to bend, twist, stretch and otherwise make movements necessary to perform everyday functions. In particular, such limited range of motion can make it difficult, if not impossible, to grasp and/or manipulate out-of-reach objects. Consequently, many individuals could benefit greatly from a manually operable device capable of extending their reach and adapted for gripping or otherwise manipulating objects or articles. Various pick-up devices and related implements are known in the prior art. However, they suffer from one or more drawbacks and/or limitations.

A common disadvantage of existing pick-up devices is their relatively heavyweight, complex construction incorporating numerous components and, thereby, adding to manufacturing complexity and cost, increasing the likelihood of malfunction, and requiring prefabrication prior to shipment to a place of distribution or an end user. Another disadvantage of many existing pick-up devices is that they often incorporate trigger mechanisms pivotally situated within the body of the device. Consequently, upon squeezing the trigger toward the handle, the devices tend to pivot. This added rotation motion makes such devices somewhat unstable, especially for use by individuals having limited strength and hands dexterity.

Furthermore, many known devices are designed for a particular specialized function requiring a specialized jaw shape or configuration that does not lend itself to the more versatile use required in every day living. By way of example, U.S. Pat. No. 4,160,563 discloses a pick-up device for grasping live animals, U.S. Pat. No. 5,590,923 discloses a pick-up device for grasping hot investment molds, U.S. Pat. No. 5,577,785 discloses a pick-up tool for picking up objects capable of being grasped by suction cups, U.S. Pat. No. 5,857,723 discloses a tool for grasping a spark plug wire or boot, and U.S. Pat. No. 5,570,919 discloses a remote grapple adapted for retrieving a bar of soap from the floor.

Accordingly, it would be desirable to provide a pick-up device overcoming the aforementioned disadvantages and limitations of the prior art and particularly a lightweight pick-up device adapted for use by individuals having a limited range of motion, strength, and hands dexterity. It would be desirable to provide such a device having a simple, lightweight construction lending itself to inexpensive manufacture and on-site assembly by a distributor, therapist or, if required, by an end user substantially without requiring special tools or know how.

SUMMARY OF THE INVENTION

The invention is directed to a manually operated pick-up device having a simplified easy-to-construct design incorporating a minimal number of parts, thereby facilitating manufacturing and enabling assembly substantially without requiring special tools or techniques. The device is particularly adapted for use by individuals having a limited range of motion such as, for example, elderly and handicapped persons.

In one general aspect of the present invention, a manual pick up device is provided which includes a housing having handle and fixed jaw portions separated by a longitudinally extending shank. A movable jaw member is adapted for cooperation with the fixed jaw and having a distal end pivotally mounted within an interior space of the housing and a proximal end extending outwardly therefrom through a housing opening.

An actuating trigger has upper and lower portions captivated within an interior space of the housing in a manner limiting trigger motion to a longitudinal direction. An arrangement is formed for urging the trigger in a direction away from the handle portion and toward the cooperating jaws.

A connection element is attached at one end to the actuating trigger and at the other end connected to the movable jaw, such that squeezing the trigger toward the handle effects pivotal motion of the movable jaw, thereby urging the movable jaw toward the fixed jaw portion of the housing in order to grasp an object therebetween.

In another aspect of the present invention, the housing is comprised of first and second longitudinally extending housing portions, or segments, having integral arrangement for enabling snap-fit attachment to each other during device assembly.

In a further aspect of the present invention, interior surfaces of the housing are provided having integral structures adapted for engaging upper and lower portions of the actuating trigger in order to guide trigger movement longitudinally. In this aspect of the invention, the trigger preferably comprises an inverted L-shaped member having an upper segment slidably captivated between the integrally formed arrangement projecting inwardly from upper and lower interior surfaces of the shank portion of the housing. Furthermore, the trigger preferably includes a lower segment having projections slidably engaging one or more interior guide walls extending longitudinally along an interior surface of the handle.

In another aspect of the present invention, the connection element comprises a string attached at one end to an aperture in the actuating trigger and at an opposite end to a distal end of the pivotal jaw. Preferably, the string is substantially taut when the jaws are in an open position such that, upon squeezing the trigger toward the handle, the lower jaw pivots toward the fixed jaw of the housing. In this aspect of the invention, a biasing arrangement is preferably provided for pivotally urging the movable jaw toward an open position.

In still another aspect of the present invention, the upper surface of the housing has a vertically projecting hook-shaped structure serving a variety of functions. For example, the integral hook aids individuals having limited mobility while putting on or removing articles of clothing, and grasping loose out-of-reach articles. Furthermore, the hook provides a means for hanging the device from a walker, doorknob, or other structure. The housing, movable jaw and actuating trigger each have a lightweight, one-piece plastic molded construction facilitating device manufacturing.

The present invention provides a simplified design having minimal number of parts, thereby facilitating quick and efficient assembly substantially without requiring special skills or special tools. These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 is a side elevational view of the device of the present invention with one segment of the housing being removed, illustrating the device in a non-actuated, opened-jaw position;

DETAILED DESCRIPTION OF THE PREFERRED EMBODIMENTS

Shown throughout the figures, the present invention is generally directed to a manually-operated pick-up device particularly useful in aiding individuals having a limited range of motion with the grasping and/or manipulation of various objects and articles. The assembly has a lightweight, simple design incorporating a limited number of parts, thereby facilitating manufacturing of the various device components and subsequent assembly of the device with minimal requirement of special tools and/or skills.

Figure 1:
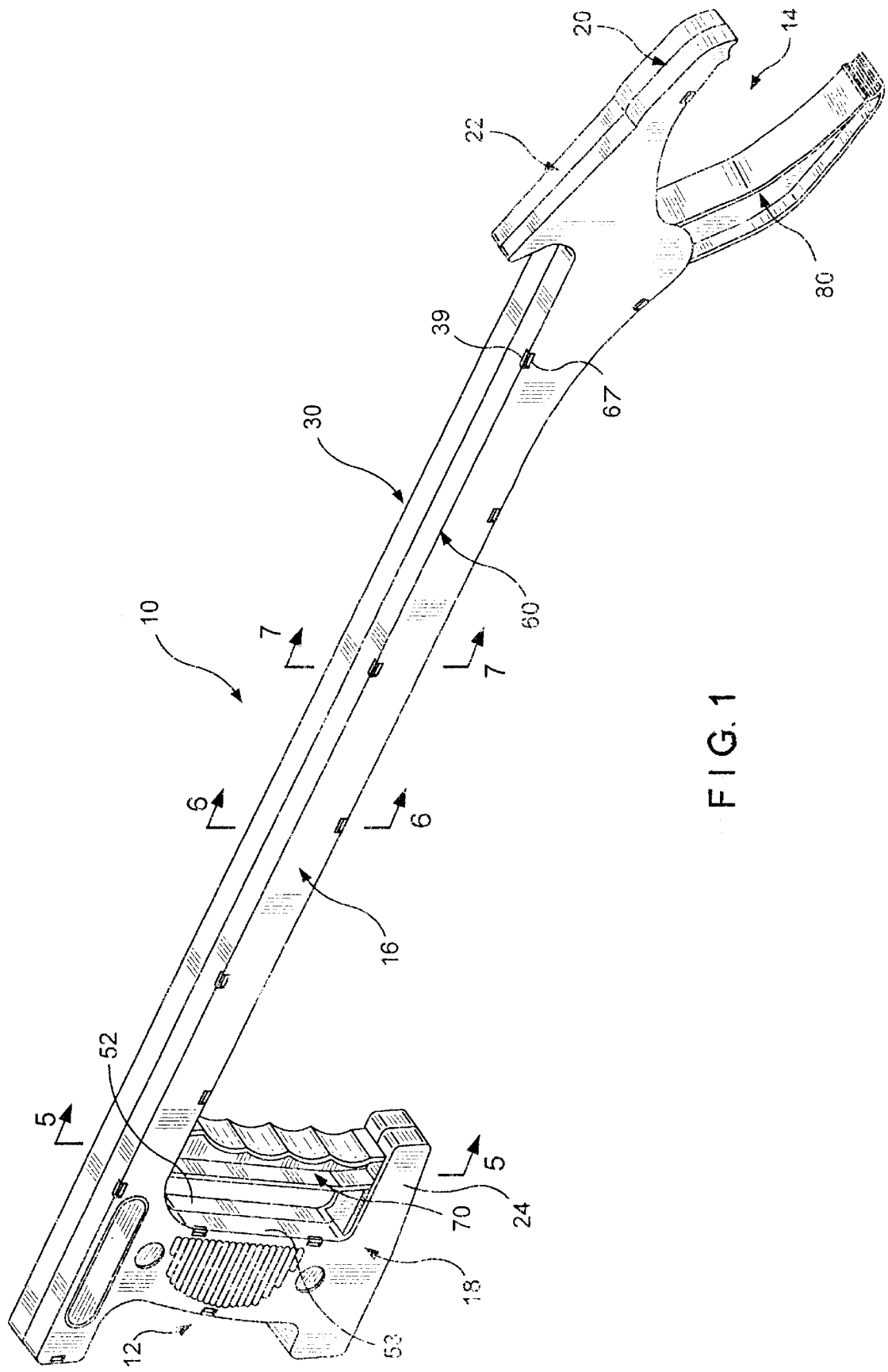
FIG. 1 is a perspective view of the device of the present invention in a fully assembled state.

Referring initially to FIG. 1, a preferred embodiment of the manual pick-up device of the present invention, shown generally as reference numeral 10, is illustrated in a fully assembled state. The device generally includes a rear or operating end 12 adapted for receiving the device by an operator as well as a front or object-grasping and manipulation end 14. A housing is provided generally comprising an elongated shank 16 separating a handle portion 18 and a fixed jaw portion 20. Preferably, the housing is comprised of first and second longitudinally extending housing portions 30 and 60, which are secured to each other by attachment arrangement. It will be discussed in full detail hereinbelow that in the preferred embodiment of the invention the attachment arrangement is in the form of a snap-fit attachment system 39, 62. A slidable actuating trigger 70 is attached by a connection element 90 (see FIGS. 2–4) to a pivotally movable lower jaw 80. In operation, trigger 70 is squeezed by a hand of a user toward operating end 12 to effect pivotal movement of lower jaw 80 toward fixed upper jaw 20. An integrally formed hooked structure 22 provides additional object grasping and manipulation capability.

An important, aspect of the device of the present invention resides in the device being lightweight, which is mainly achieved through the simplicity of its design. In this respect, the device incorporates a minimal number of components required for its assembly and operation. Furthermore, in lieu of using a multitude of mechanical fasteners to secure the housing portions to one another, and to secure the movable components in place, the present invention incorporates a housing construction which can be formed with integrally molded structural support and attachment features.

Figure 2:
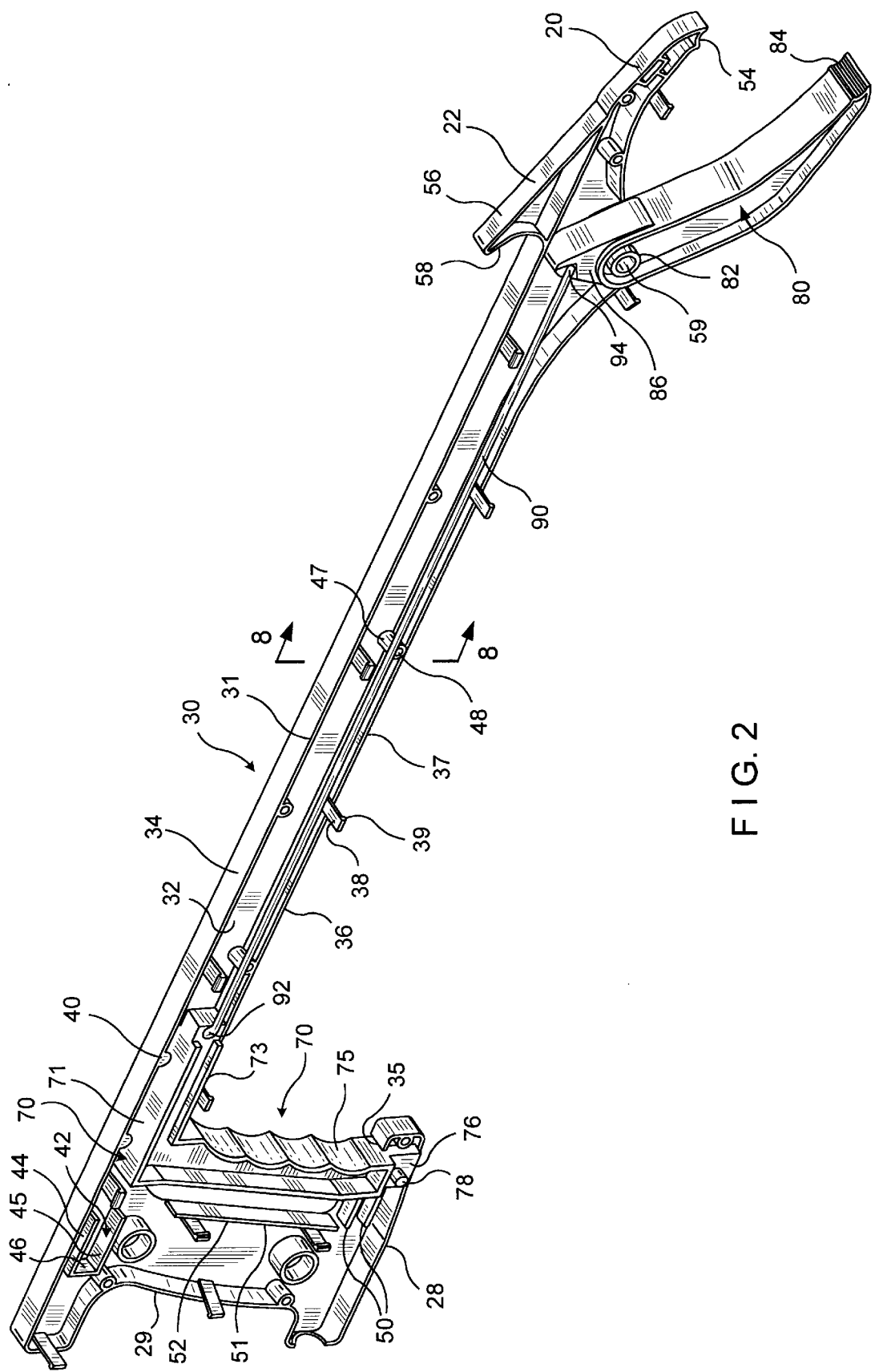
FIG. 2 is a perspective view of the device of the present invention with one segment of the housing being removed.
Figure 3:
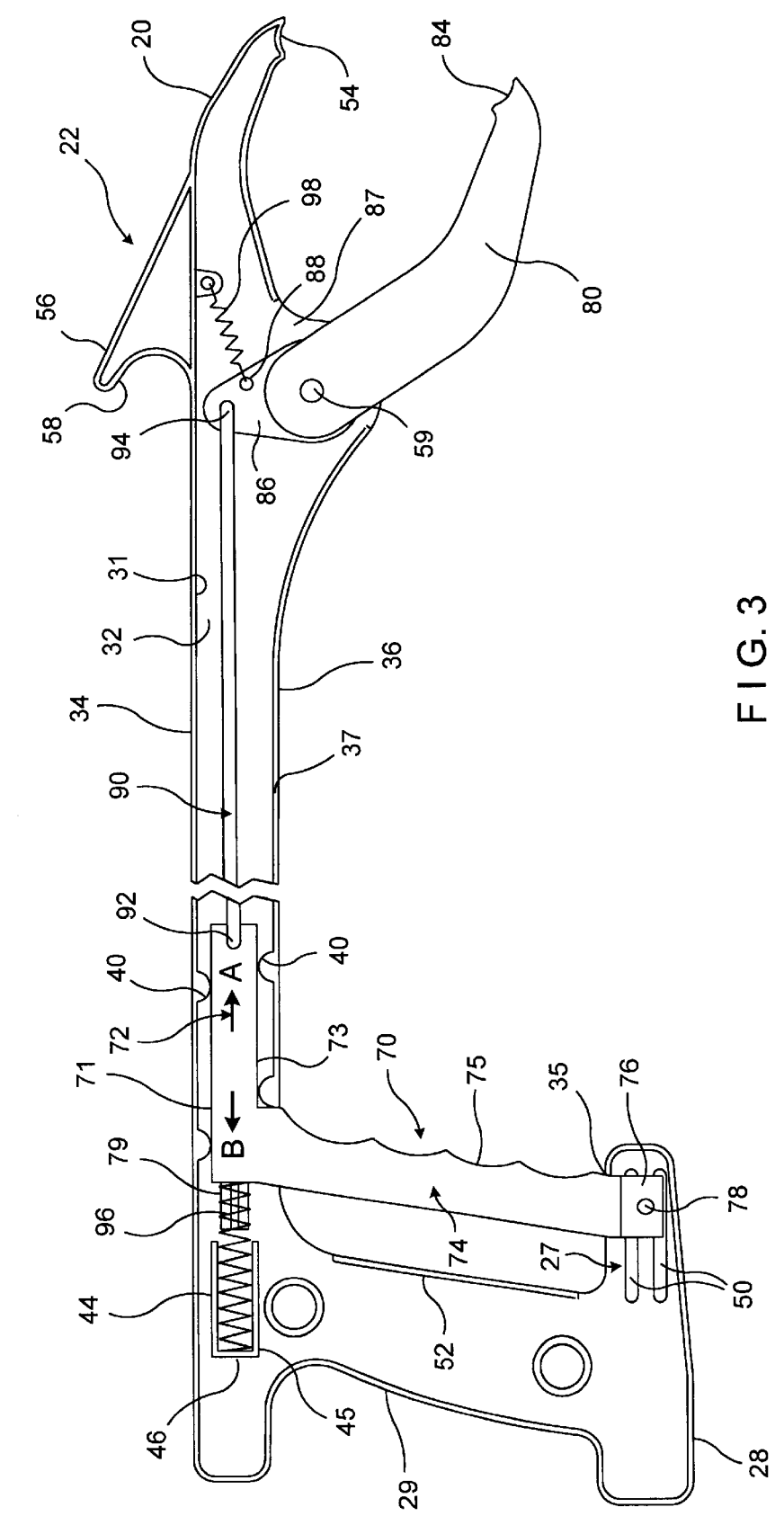
Figure 4:
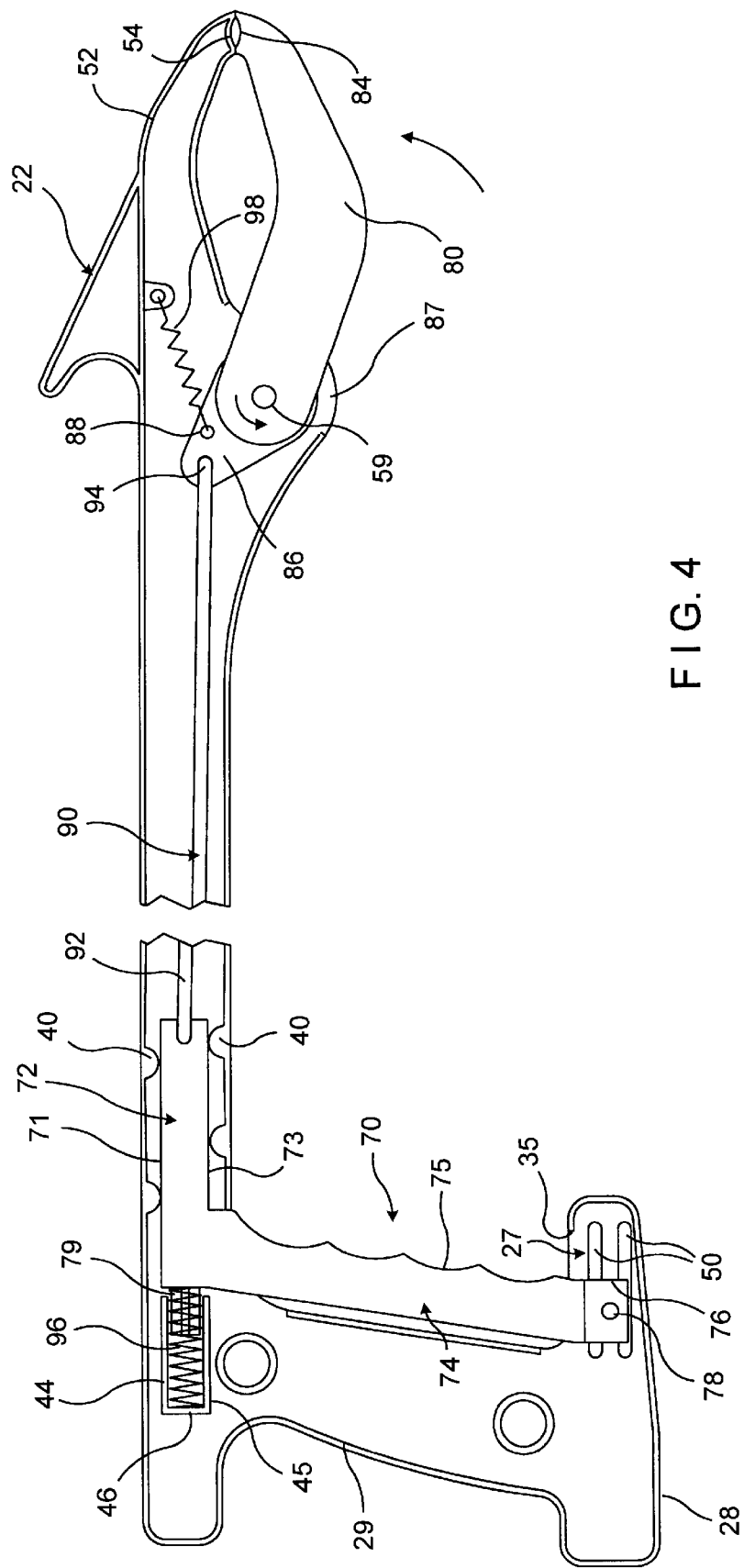
FIG. 4 is the side elevational view of the device of the present invention with one segment of the housing being removed, illustrating the device in an actuated, closed-jaw position.
Figure 5:
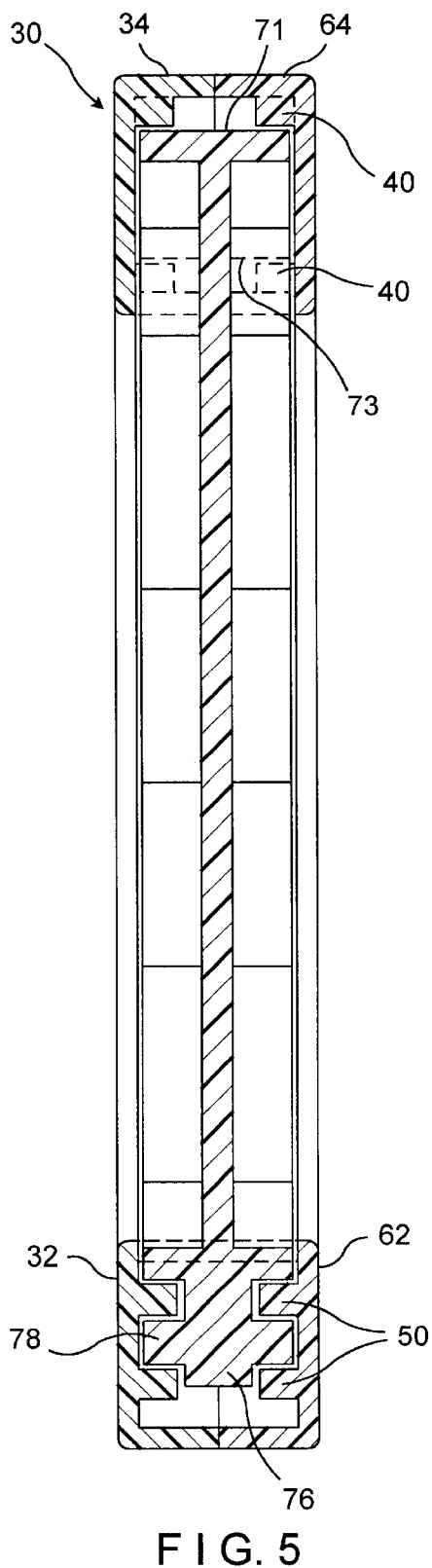
FIG. 5 is a cross-sectional view taken along a cutting plane 5—5 of FIG. 1.

Referring now primarily to FIGS. 2–4, various features of the invention will be described in more detail. The shank area of the first housing portion 30 is generally bounded by sidewall 32, upper perimeter wall segment 34 and lower perimeter wall segment 36. The handle area of the first housing portion 30 is generally defined by a front handle perimeter wall segment 52, which is spaced from a rear handle perimeter wall segment 29. A lower handle perimeter wall segment 28 extends forwardly beyond the front wall segment 52 and terminates at a front edge 35 defining a foot portion. Thus, a trigger operational space 27 is formed between the front edge 35 and wall segment 52. As will be described in greater detail hereinbelow, the gap between perimeter wall segments 34 and 36 is adapted to accommodate the connection element and facilitate transfer of the longitudinal motion of actuating trigger 70 into the pivotal motion of the lower jaw 80. As best depicted in FIGS. 1 and 5–8, the shank area of the second housing portion 60 is formed by a sidewall 62, an upper perimeter wall segment 64 and a lower perimeter wall segment 66. Similar to the first housing portion, the handle area of the second housing portion is formed by a front handle perimeter wall segment 53 spaced from a rear perimeter wall segment. The second housing portion is aligned with the corresponding first housing portions when assembled.

Figure 6:
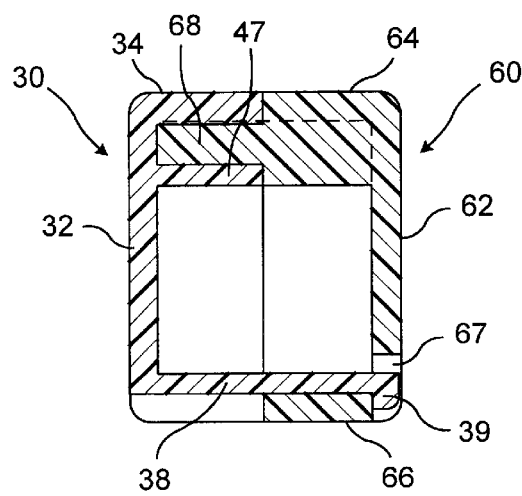
FIG. 6 is a cross-sectional view taken along a cutting plane 6—6 of FIG. 1.
Figure 7:
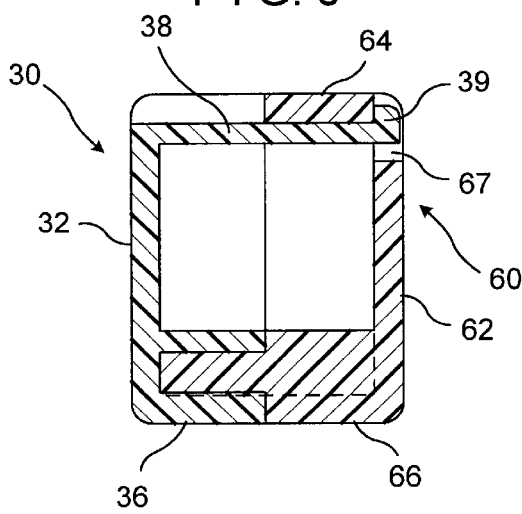
FIG. 7 is a cross-sectional view taken along a cutting plane 7—7 of FIG. 1.
Figure 8:
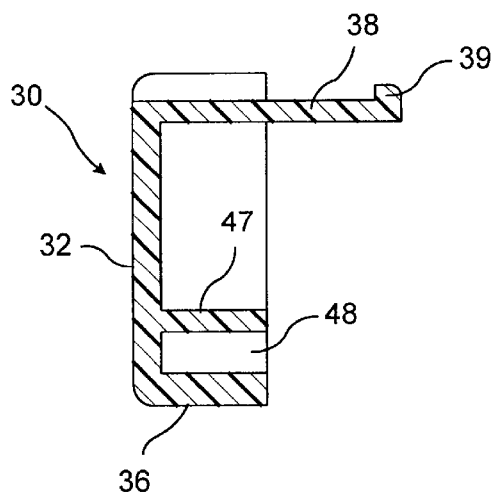
FIG. 8 is a cross-sectional view taken along a cutting plane 8—8 of FIG. 2.

As best depicted in FIGS. 6 and 7, a plurality of spaced apart structures 47 having channels 48 extending at least partially therethrough can be integrally formed along the inner surface of upper and lower perimeter walls sections 34 and 36, and extend toward side wall 32 in a direction transverse to the longitudinally-extending shank 16.

The second housing portion 60 can be provided having a plurality of corresponding spaced-apart projections sized and shaped for being snugly received through channels 48 during the device assembly. In particular, the mating projections 68 and channels 48 facilitate proper alignment of the first and second housing portions, 30 and 60, during attachment to one another. Additionally, these structures aid in minimizing relative movement of the first and second housing portions along the longitudinal plane bisecting the housing.

As best illustrated in FIGS. 2 and 6–8, tabs 38 provided at spaced-apart intervals projecting laterally from edges 31, 37, and 51 of respective upper perimeter, lower perimeter, and handle perimeter wall segments 34, 36, and 52 terminate at thickened end projections 39, which are sized and shaped for snap fitting engagement with corresponding apertures 67 formed in the second housing portion 60.

Although, a specific attachment arrangement providing attachment between the first housing portion 30 and second housing portion 60 has been discussed hereinabove, it should be obvious to any person of ordinary skill in the art that any other means of attachment between the housing portions is within the scope of the invention. For example, structures having channels extending partially therethrough as well as tabs can be formed as a part of the second housing portion, whereas the mating projections and corresponding apertures can be formed as a part of the first housing portion. Furthermore, the mating projections and channels can be substituted by other elements performing similar functions.

As best illustrated in FIGS. 2–4, movable lower jaw member 80 is provided at the front end 14 and adapted for cooperation with the fixed jaw 20. In the preferred embodiment of the invention, the lower jaw 80 is pivotally supported upon integral substantially cylindrical nub 59 extending transversely from the inner surface of the first housing sidewall 32. Preferably, the lower jaw member 80 includes a mounting aperture having a radius defined by the inner diameter of thickened substantially cylindrical wall structure 82 and, in any event, slightly larger than the diameter of nub 59 to enable jaw member 80 to pivot smoothly and freely thereabout. The lower jaw member 80 has a distal end portion 86 spaced from the pivot point 59, which terminates at a serrated pincer portion 84 and cooperates with a corresponding serrated pincer portion 54 formed in the fixed jaw portion 52 during use. In the assembled condition, the distal end portion 86 is situated within the interior of the housing, whereas the central area thereof and the pincer portion 84 extend outwardly through the opening 87 formed within the lower perimeter wall section 36 (see FIGS. 3 and 4).

A trigger mechanism is provided for indirectly actuating pivotal movement of lower jaw member 80. Preferably, as best depicted in FIGS. 2, 3, 4 and 5, the trigger mechanism comprises a trigger member 70 having an inverted L-shaped configuration with a longitudinally disposed upper portion 72 and a downwardly extending lower portion 74 which is transversely oriented relative to the upper portion. The transverse portion 74 is preferably formed with finger engaging recesses 75 for facilitating gripping during use. Longitudinal upper portion 72 is bounded at its upper and lower surfaces 71 and 73, by projections 40 extending interiorly from upper perimeter wall segment 34 and lower perimeter wall segment 36. At a lower end area 76 of transverse trigger portion 74, outwardly extending projections 78 are provided. These projections are slidably guided by longitudinally disposed integral housing wall guidance structures 50. In this manner, trigger member 70 is restricted to longitudinal movement within the first housing portion to a range of motion limited by edge 35 in the rear to front direction, as indicated by the arrow A, and the perimeter wall segment 52 in the front to rear direction, as indicated by the arrow B. Similar situation exists for second housing portion counterparts. Although two guiding structures 50 are shown in FIGS. 3 and 4, it should be understood that one structure 50 should be capable of providing the required guidance.

A biasing member or spring 96 is formed with a distal end captivated within a housing structure defined by integrally formed walls 44, 45 and 46, and with a proximal end received over a rearward depending nub 79 associated with the trigger member 70. The biasing member 96 functions to urge, or bias, the trigger in the rear to front or anterior direction.

A connection element 90 having a distal end 92 and proximal end 94 is provided between the trigger member 70 and the movable jaw 80. In the assembled condition, the connection element 90 is attached at its distal end 92 to the trigger upper portion 72 and at its distal end 94 to the distal end portion 86 of pivotal jaw member 80. In one embodiment of the invention, the connection element 90 is comprised of a substantially rigid rod-shaped member. In this aspect of the invention, when no force is applied by the hands of the user and the trigger 70 is in the forwardly biased, or non-actuated position, the connecting rod element 90 urges the lower jaw 80 to pivot in a clockwise direction about pivot point 59. This maintains the lower jaw 80 in an open position (as best illustrated in FIG. 3). Correspondingly, when the trigger 70 is squeezed or rearwardly directed force is applied by the fingers of a user and trigger 70 is rearwardly biased, connection element 90 urges lower jaw 80 to pivot in a counterclockwise direction about the pivot point 59. This action forces the lower jaw toward a closed position (as best illustrated in FIG. 4).

In another embodiment of the invention, the connection element 90 is in the form of a flexible member such as a string. In this aspect of the invention, an auxiliary biasing means 98 is provided for urging clockwise rotation of lower jaw 80 about pivot point 59, or toward an open position. For example, the auxiliary biasing member 98 can be attached at one end thereof to an aperture 88 in the distal end portion 86 of the movable jaw 80 and at an opposite end it is connected to the inner area of the housing. However, as will be appreciated by those skilled in the art, myriad other means are contemplated for performing this biasing function without departing from the scope of the invention. In this aspect of the invention, connection element 90 is preferably substantially taut when no force is applied by the hand of an operator and trigger 70 is in a non-actuated position (as shown in FIG. 3). As trigger 70 is squeezed by the operator and rearwardly biased during actuation, the connection element 90 urges lower jaw 80 to pivot in a counterclockwise direction about pivot point 59, forcing the lower jaw toward a closed position (as shown in FIG. 4). Subsequently, as trigger 70 is released, the biasing member or tensioned spring 96 urges lower jaw 80 in a clockwise direction back toward its open or non-actuated position.

The auxiliary biasing member 98 can also be used with the embodiment of the invention in which the connection element 90 is in the form of a substantially rigid rod. In this application, the rearwardly positioned biasing member 96 can be eliminated.

In another aspect of the invention, an integrally formed hooked portion, shown generally as reference numeral 22, is provided projecting upwardly from the device housing. Preferably, hooked portion 22 is defined, at least in part, by a tapered upper surface 56 and a curved rear surface 58. Similar to the above-discussed elements of the invention, hooked portion 22 also forms a part of first and second housing portions 30 and 60. For example, the hook-shaped structure 22 can be used to assist disabled individuals in putting on jackets, pulling up slacks or shirts, or removing socks. This is especially useful for individuals having difficulty bending, a limited range of motion, or the use of only one hand or arm. Additionally, the hook-shaped structure 22 is useful for grasping and/or manipulating hard-to-reach articles and provides a means for hanging the device from a walker, doorknob or other convenient structure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A manual pick-up device, comprising:
    a housing longitudinally bisected into corresponding first and second housing segments each defining at least a proximally located handle portion and a distally located stationary jaw portion separated by a longitudinally extending shank portion;
    an attachment arrangement for attachment of said housing segments to each other, said attachment arrangement comprises a plurality of resilient fastening members projecting laterally from one of said first and second housing segments and adapted for engagement with corresponding receiving elements in the other one of said first and second housing segments;
    a movable jaw portion pivotably mounted within said housing; and an actuating trigger associated with said handle portion, whereby manual actuation of said trigger toward said handle causes pivotal movement of said movable jaw portion, thereby urging said movable jaw portion toward the stationary jaw portion of said housing facilitating grasping of an object situated therebetween.

2. A manual pick-up device as recited in claim 1, wherein said movable jaw portion is pivotably supported upon a nub extending outwardly from an interior surface of said housing in a direction transverse to said longitudinally extending shank portion.

3. A manual pick-up device as recited in claim 1, wherein the handle portion of said housing has a forwardly extending foot portion, at least one interior guide wall extending longitudinally along an interior surface of said foot portion, said actuating trigger is formed as an inverted generally L-shaped member having upper segment and lower segment which is transverse to said upper segment, said lower segment including at least one projection extending in a direction transverse to the longitudinal direction of movement of said trigger.

4. A manual pick-up device as recited in claim 3, wherein said at least one projection extending from the lower segment of said trigger slidably engages said foot portion of the interior guide wall.

5. A manual pick-up device as recited in claim 1, further comprising an auxiliary biasing arrangement for pivotally urging said movable jaw portion away from said stationary jaw portion.

6. A manual pick-up device as recited in claim 5, wherein said auxiliary biasing means is a spring member having one end thereof connected to the movable jaw portion and another end connected to the interior of the housing at said stationary jaw portion.

7. A manual pick-up device as recited in claim 1, wherein said housing further comprises an integral hooked portion projecting outwardly from said housing at the stationary jaw portion.

8. A manual pick-up device as recited in claim 1, wherein said stationary and movable jaw portions each have serrated pincers formed at distal ends thereof, said pincers are adapted to engage an object situated therebetween.

9. A manual pick-up device as recited in claim 1, wherein said movable jaw portion has a distal end pivotally mounted within an interior space of said housing and a proximal end extending forwardly therefrom through a housing opening defined by said first and second housing segments; and said actuating trigger having upper and lower segments, said upper segment being slidably captivated within an interior housing space defined by said first and second housing segments in a manner limiting movement of said actuating trigger to a direction substantially parallel to said longitudinally extending shank portion.

10. A manual pick-up device, as recited in claim 1, further comprising a connection element connecting an upper portion of said actuating trigger to the distal end of said movable jaw portion.

11. A manual pick-up device as recited in claim 10, wherein said connection element further comprises a substantially rigid rod member.

12. A manual pick-up device as recited in claim 10, wherein said connection element further comprises a non-rigid member.

13. A manual pick-up device as recited in claim 1, wherein said actuating trigger is formed having a lower segment and an upper segment captivated within an interior space of said housing so as to facilitate movement of said trigger along said longitudinally extending shank portion, said longitudinally extending shank portion being formed by at least top and bottom wall portions spaced from each other, guide arrangements projecting inwardly toward each other from said top and bottom wall portions and adapted for guiding of movement of said upper segment of the actuating trigger between said wall portions.

14. A manual pick-up device as recited in claim 13, further comprising a biasing arrangement for biasing said actuating trigger.

15. A manual pick-up device as recited in claim 14, wherein said biasing arrangement for biasing said actuating trigger comprises a spring member.

* * * * *